United States Patent
Akad

[19]

[11] Patent Number: 6,148,970

[45] Date of Patent: Nov. 21, 2000

[54] ENERGY ABSORBING DEVICE

[76] Inventor: Osman E. Akad, 185 S. Westhaven Dr., Apt. 209, Oshkosh, Wis. 54904

[21] Appl. No.: 09/065,603

[22] Filed: Apr. 24, 1998

[51] Int. Cl.[7] ............................... F16F 7/12; B60R 19/34
[52] U.S. Cl. ...................... 188/371; 188/266; 293/133; 293/134
[58] Field of Search ..................... 188/376, 377, 188/276, 266.8, 266, 371, 287, 286, 284, 268, 275; 267/136, 139; 293/132, 133, 134, 107

[56] References Cited

U.S. PATENT DOCUMENTS

| | | | |
|---|---|---|---|
| 1,658,962 | 2/1928 | Aikens | 188/287 |
| 3,339,674 | 9/1967 | Kroell et al. | 188/374 |
| 3,428,150 | 2/1969 | Muspratt | 188/377 |
| 3,489,087 | 1/1970 | Soderberg | 102/382 |
| 3,556,268 | 1/1971 | Fister | 188/286 |
| 4,205,753 | 6/1980 | Raeber | 293/134 |
| 4,255,986 | 3/1981 | Mukoyama | 188/377 |
| 4,823,923 | 4/1989 | Moyer | 188/376 |
| 4,844,213 | 7/1989 | Travis | 188/377 |
| 5,566,794 | 10/1996 | Wiard | 188/287 |
| 5,598,904 | 2/1997 | Spyche, Jr. | 188/287 |
| 5,794,975 | 8/1998 | Nohr et al. | 280/753 |

*Primary Examiner*—Michael Mar
*Assistant Examiner*—Thomas Williams
*Attorney, Agent, or Firm*—Sughrue, Mion, Zinn, Macpeak & Seas, PLLC

[57] ABSTRACT

An energy absorbing device adapted to be connected between a motor vehicle bumper and a motor vehicle frame includes a liquid filled cylinder having a piston therein connected to the impact receiving device. The cylinder is provided with a plurality of weakened areas along the length of the cylinder which will rupture in sequence upon application of force by the piston to the liquid, thereby dissipating the force applied to the impact receiving means. A spring or an explosive device may be provided between the piston and closed end of the cylinder or the interior walls of the cylinder may be roughened to provide additional resistance to the movement of the piston within the cylinder. Additionally, the liquid expelled from the cylinder can be channeled through various devices to apply a reverse force to the impact receiving device.

5 Claims, 3 Drawing Sheets

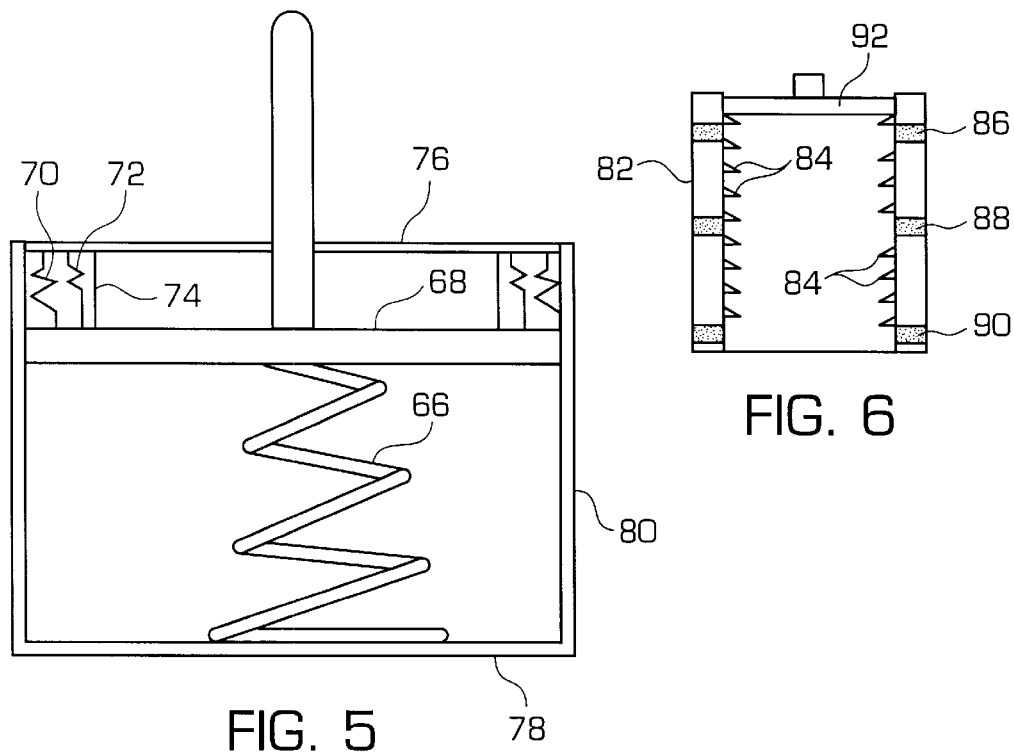
FIG. 5
FIG. 6
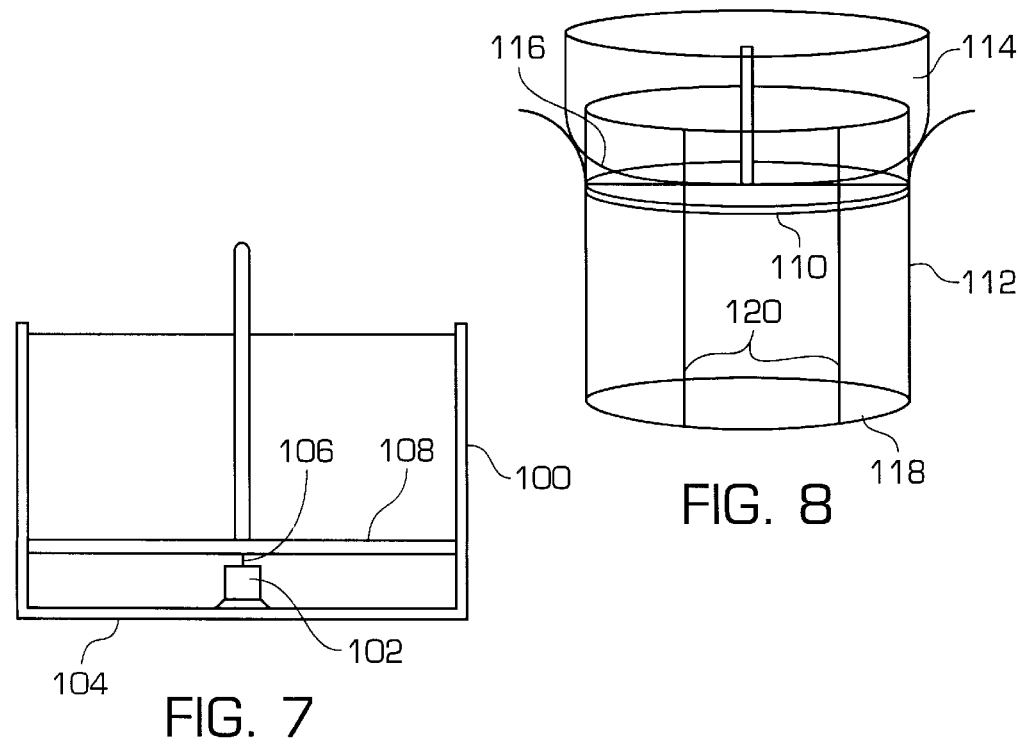
FIG. 7
FIG. 8

ENERGY ABSORBING DEVICE

BACKGROUND OP THE INVENTION

The present invention is directed to an energy absorbing device, and more specifically, to a fluid-mechanical shock absorber for use with an automobile bumper.

The conventional automobile bumper has been proven to be notoriously ineffective in preventing substantial damage to automobile body components, such as the grill, trunk lid and fenders. Numerous attempts have been made over the years to provide a stronger bumper but a strong bumper per se is relatively useless unless it is mounted on the frame with the interposition of adequate shock absorbing devices.

The U.S. patent to Moyer (U.S. Pat. No. 4,823,923) discloses an energy dampening apparatus for use between the frame of an automobile body and the bumper. Sudden impacts are dissipated through the sequential sheering of rods or pins anchored perpendicularly to the incoming force and through the compression and evacuation of gel through holes or valves in a cylinder. By varying the diameter and length of the cylinder, pistons and the number, size and composition of sheer pins, the number and size of restriction holes and the amount of gel, the system will dissipate impacts within predetermined limits. However, the sheer pins in any given embodiment are identical and the holes through which the gel is extruded are all of equal size. Accordingly, as the energy dampening apparatus is compressed in length, there is no sequential increase in the resistance provided against further compression.

The U.S. Patent to Lohr et al. (U.S. Pat. No. 4,641,872) discloses a collision damper having a damping piston and a deformable tube connected thereto. Upon movement of the deformation tube upon impact to an automobile bumper or the like, the fluid within a chamber will be forced through a throttle opening into a second fluid chamber whereby the increased fluid pressure in the second chamber will force a piston to move and compress a gas within a gas chamber. If the force is great enough, the deformation tube will also be deformed along predetermined weak spots. Although a sequential dampening affect is achieved, there is no disclosure of providing a plurality of weak spots of varying strengths which will rupture in sequence upon the application of pressure to a fluid within the cylinder.

The U.S. patent to Harano (U.S. Pat. No. 4,190,276) discloses a deformable impact absorbing device for vehicles which may be mounted between the frame of the vehicle and the vehicle bumper. The device is comprised of a tapered polyhedral having a plurality of side cut-outs with the upper and lower edges of the cut-outs protruding outwardly and inwardly respectively from the side wall. Upon application of an axially directed force to the body, the body will undergo a sequential collapse.

The U.S. patent to Keeler (U.S. Pat. No. 4,257,581) discloses an impact absorbing strut for interconnecting the chassis and bumper of a motor vehicle. Keeler discloses an impact absorbing strut comprised of at least two telescoping tubes defining a damping fluid chamber. A solid piston is slidably mounted in the first fluid filled chamber and upon axial movement, the fluid will be pressurized. In one embodiment, a blow-out plug is provided which will be forced out of the end of the chamber upon an increase in the fluid pressure, whereby the fluid will be discharged. In other embodiments, each sequential fluid filled chamber is provided with an opening in the bottom end through which the fluid is expelled from one chamber to another to provide a sequential dampening effect.

The U.S. patent to Mitchell (U.S. Pat. No. 3,200,584) is directed to a sheer slide cushion wherein a sheer slide or piston is slidably mounted within a combustion chamber of a rocket engine. A plurality of spaced propellant inlet ports are provided which are sealed by sheer cups supported by and mounted in recesses of the sheer slide. A composite cushion is provided between complementary shoulders on the piston and cylinder. Upon ignition of the rocket engine, the sheer slide will be moved to crush a middle band in the composite cushion. Although the sheer cups will be sheered off upon relative movement between the piston and the cylinder, the primary purpose of the sheer cups is simply to allow communication between inlet ports and ports in the slide and do not have any relation to the cushioning which is accomplished solely by the composite cushion between the piston and the cylinder. Furthermore, all of the sheer cups are sheered simultaneously.

SUMMARY OF THE INVENTION

The present invention provides a new and improved energy absorbing device for mounting between a bumper and frame of a vehicle. The device is comprised of a hydro-mechanical shock absorption mechanism for the stepwise reduction of the incoming force of impact on the bumper.

The energy absorbing device of the present invention is comprised of a piston travelling within a liquid filled chamber, which has a plurality of weak spots formed in sequence along the length of the side wall of the cylinder. A first weak spot closest to the impact receiving end of the device is the weakest of all the spots and subsequent weak spots gradually increase in strength. Upon the application of a force to the piston, the fluid pressure will cause the first weak spot to rupture. If the force applied to the piston is sufficiently large, subsequent weak spots will rupture in sequence to provide a superior shock absorption mechanism.

The present invention provides a new and improved energy absorbing device of the type described above wherein the energy absorption may be supplemented by a coil spring between the piston and the end of the cylinder remote from a bumper, a plurality of elongated flexible members of varying length connected between the piston and the end of the cylinder closest to the bumper which can be ruptured in sequence, or a plurality of protrusions extending inwardly from the wall of the cylinder which can be sequentially engaged and sheered by the piston upon axial movement thereof. The foregoing features may be used independently or in varying combinations with the sequential weak spots in the cylinder wall. Additionally, the piston can be provided with an oversized tapered portion which will deform the wall of the cylinder and cause the same to split along predetermined weakened lines.

The present invention provides a new and improved energy absorbing device of the type set forth above wherein the fluid expelled from the cylinder upon rupturing of the weak spots in the cylinder wall can be channeled to move a second piston in the opposite direction to the piston within the cylinder to apply a force to the bumper in opposition to the original impact force applied to the bumper. Alternatively, the channeled fluid exhausted from the cylinder can be directed against the rear face of the bumper to provide increased resistance to movement of the bumper. Finally, the fluid expelled from the cylinder can be channeled through passages containing a plurality of membranes in sequence which may be ruptured to assist in dissipating the impact force against the bumper.

The above and other objects, features and advantages of the present invention will be more apparent and more readily appreciated from the following detailed description of preferred exemplary embodiment of the present invention, taken in connection with the accompanying drawings.

BRIEF DESCRIPTION OF THE DRAWINGS

FIG. 5 is a schematic view of a piston and cylinder arrangement according to the present invention with the addition of a modified coil spring and a plurality of varying length tension members.

FIG. 6 is a schematic view of a piston and cylinder arrangement according to the present invention with the addition of sheerable protrusions on the inner wall of the cylinder.

FIG. 7 is a schematic view of a piston and cylinder arrangement similar to FIG. 1 with the addition of an explosive device to provide a counter-force on the piston.

FIG. 8 is a schematic view of a piston and cylinder arrangement according to the present invention showing a deformable cylinder in conjunction with an oversized piston.

DETAILED DESCRIPTION OF THE INVENTION

Figure 1:
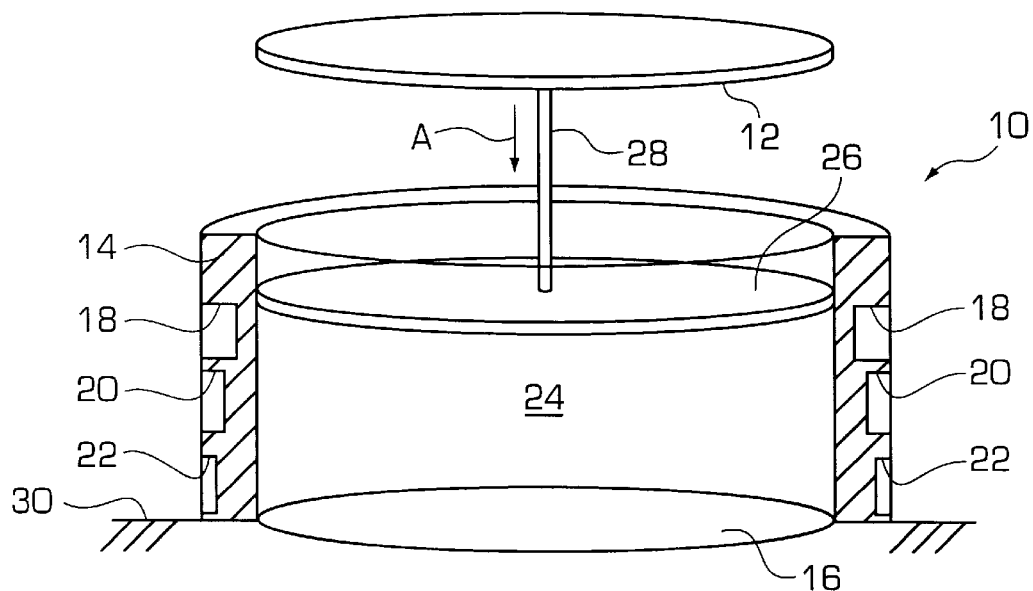
FIG. 1 is a schematic view of a piston and cylinder arrangement, partly in section, operatively connected to a bumper for absorbing impact energy applied to the bumper.

The first embodiment of the present invention is shown schematically in FIG. 1 wherein the energy absorbing device 10 of the present invention is usable in conjunction with a conventional motor vehicle bumper 12. The energy absorbing device 10 is comprised of a cylinder 14 having a bottom wall 16. A plurality of weak spots are formed in the side wall of the cylinder. The weak spots are provided by a plurality of recesses or depressions 18, 20 and 22 disposed along the length of the cylinder with the weakest spot 18 being closest to the top of the cylinder. Since the recess 18 is the deepest recess, a smaller amount of material remains between the bottom of the recess and the interior wall of the cylinder. The recesses become progressively more shallow and accordingly, a greater amount of wall material remains between the bottom of each recess and the interior wall of the cylinder so that the weak spots become progressively stronger. The cylinder may be formed of any suitable material such as aluminum, plastic or the like.

The cylinder 14 is filled with a fluid such as water, oil or any other suitable fluid and a piston 26 is slidably mounted in the cylinder 14 in close sliding fit with the wall of the cylinder. A piston rod 28 is connected between the piston 26 and the conventional motor vehicle bumper whereas the bottom wall of the cylinder may be connected to the frame 30 of the motor vehicle by any suitable means.

When a force is applied to the motor vehicle bumper 12 as a result of an impact with another motor vehicle or a stationary object, a force is applied to the piston 26 through the piston rod 28 in the direction of the arrow A. Since the fluid 24 is incompressible, a force is applied to the weak spots whereby the weakest spots 18 will rupture first. As the fluid is expelled through the recesses 18, the piston 26 will be allowed to travel further into the cylinder toward the bottom wall 16. If the applied force A is sufficient, the next weakest spots in the cylinder wall adjacent the recesses 20, will rupture. Thus the sequence of rupturing will continue depending upon the magnitude of the force applied to the bumper and the number of recesses of varying depth provided in the wall of the cylinder along the length thereof.

Figure 2:
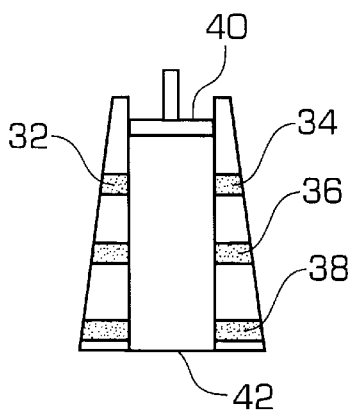
FIG. 2 is a schematic view of a second embodiment of a piston and cylinder arrangement.

In the second embodiment of the invention, as shown in FIG. 2, the principle remains the same but the cylinder wall 30 gradually increases in thickness along the length thereof. A plurality of plugs 34, 36 and 38 are provided in sequence along the length of the cylinder with the plugs becoming increasingly thicker and therefore stronger. As the piston 40 approaches the bottom wall 42 of the cylinder, the plugs 34 which define the weakest spots, will easily rupture. The plugs 36 and 38 provide a sequential increase in the resistance to rupturing.

Figure 3:
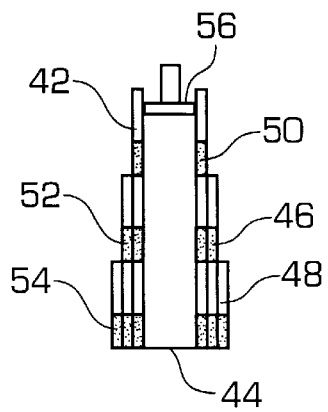
FIG. 3 is a schematic view of a third embodiment of the piston and cylinder arrangement according to the present invention.

The third embodiment of the invention, as shown in FIG. 3, is very similar to that of the second embodiment shown in FIG. 2 since the walls of the cylinder 42 increase from the top of the cylinder to the bottom wall 44. The cylinder is formed by a plurality of laminations 46 and 48 extending about the circumference of the cylinder 42. The plugs 50, 52 and 54, which are disposed in sequence along the length of the cylinder, are progressively thicker toward the bottom wall 44 of the cylinder and the resistance of the plugs to rupturing due to fluid pressure being applied by the fluid in the cylinder 56, gradually increases from the top end of the cylinder to the bottom wall 44 of the cylinder.

In order to increase the resistance of the movement of the piston, a coil spring 58 may be positioned in a cylinder 60 between the piston 62 and the bottom wall 64. The side walls of the cylinder may be provided with the sequence of weak spots similar to those shown in FIGS. 1–3. Thus the spring 58 could be applied to any one of the first three embodiments.

Figure 4:
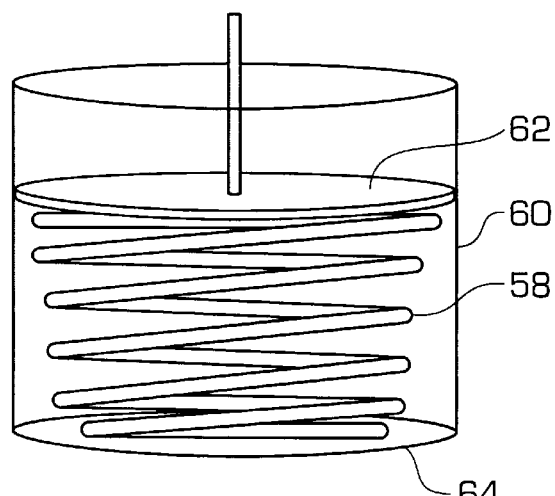
FIG. 4 is a schematic view of an assembly according to the present invention with the addition of a coil spring.

The coil may be a substantially cylindrical coil, as shown in FIG. 4 or may have a conical configuration, as shown by the coil spring 66 in FIG. 5. The difference in configuration would allow a different travel length for the piston as it moves along the length of the cylinder. As shown in FIG. 4, the individual coils of the cylindrical coil spring 58 will simply stack, one upon the other, so that there will be a substantial thickness for the compressed spring to limit the travel of the piston 62. As shown in FIG. 5, the coils of the spring 66 can nest within each other so that in the fully compressed state, all of the coils will be in a common plane thereby allowing a greater travel distance for the piston 68.

In addition to the use of a coil spring or in lieu of the coil spring, a plurality of flexible tension elements of varying length 70, 72 and 74 may be secured between a top wall 76 of the cylinder and the piston 68. Thus, as the piston 68 moves toward the bottom wall 78 of the cylinder, the shortest element 74 will extend to its full length and if the force applied to the piston 68 is sufficient, the element 74 will rupture. Continued movement of the piston 68 will then extend the next longest element 72 to its full length whereupon it will eventually rupture if the force is sufficient. Finally, the continued movement of the piston 68 will extend the element 70 to its fullest length whereupon it will rupture under sufficient pressure being applied to the piston 68. Any number of flexible elements can be secured between the top wall 76 of the cylinder and the piston 68 to provide increased resistance to the impact force applied to a bumper of a motor vehicle. The flexible tension elements or the spring may be used independently of each other or used in combination depending upon the degree of force resistance required. As in the embodiments of FIGS. 1–3, the wall of the cylinder 80 can be provided with a plurality of weak spots of gradually diminishing weakness along the length of the cylinder wall.

As shown in FIG. 6, the interior wall of the cylinder 82, is provided with a plurality of relatively closely spaced projections 84 extending over the entire surface of the interior wall of the cylinder. The cylinder wall 82 will be provided with plugs 86, 88 and 90, which provide varying degrees of rupturing similar to the embodiment of FIG. 1. Thus, upon movement of the piston 92 into the cylinder 82, the piston will sequentially break off the projections 84 in sequence. Thus the projections 84 will provide an increased degree of resistance to the movement of the piston under the influence of an impact applied to a motor vehicle bumper secured thereto. Once again, the projections may be used independently or in combination with the coil spring and variable length tension members in any desired combination.

As shown in FIG. 7, an explosive device 102 is mounted on the bottom wall 104 of the cylinder. An actuator pin 106 extends upwardly from the explosive device 102, whereby upon engagement and depression of the pin 106 by the piston 108, the explosive device 102 will be detonated. The explosive force will provide an increased resistance to the movement of the piston 108. The explosive device 102 can be used either alone or in combination with any or all of the other force resistant devices shown in FIGS. 4, 5 and 6. The cylinder 100 is provided with the usual weak spots as shown and described in the previous embodiments. In lieu of a pin actuated ignition device, the explosive charge could be detonated by electrical switches, a proximity device or any other well known means.

As shown in FIG. 8, the piston 110 and the cylinder 112 can be constructed and will operate in accordance with any of the foregoing embodiments to provide a resistance to the movement of the piston due to the applied force on a bumper secured to the piston. In addition, the piston 110 is provided with an enlarged head 114 having a downwardly and inwardly curved side wall 116 extending about the entire periphery. The upper diameter of the head 114 is greater than the diameter of the cylinder 112 so that upon movement of the piston 110 toward the bottom wall 118 of the cylinder 112, the head 114 will cause the cylinder wall to expand and rupture.

The cylinder wall may be provided with a plurality of weakened zones 120 extending longitudinally of the cylinder from one end to the other. As the force is applied by the piston head 114 to the cylinder wall, the wall will tend to rupture along the weakened lines 120 thereby providing increased resistance to the movement of the piston under the force of impact applied to the motor vehicle bumper secured thereto.

Figure 9:
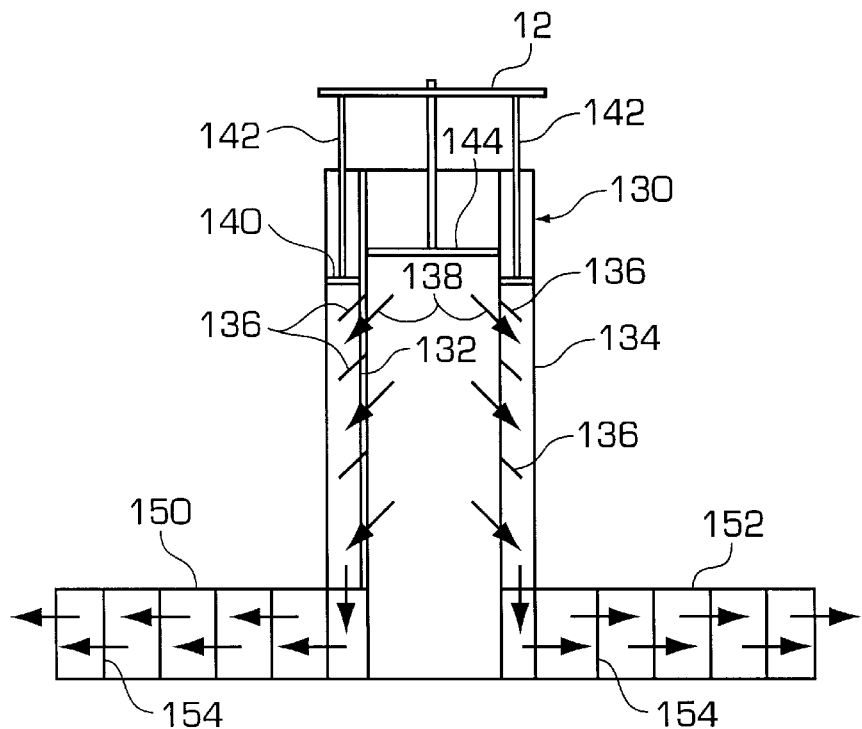
FIG. 9 is a schematic view of a piston and cylinder arrangement according to the present invention with means for channeling the fluid expelled from the cylinder to provide additional resistance.

As shown in FIG. 9, the cylinder 130 may be a double-walled cylinder having an inner wall 132 and an outer wall 134. The inner wall is provided with a plurality of rupturable weak spots disposed along the length of the cylinder which may be similar to the weak spots disclosed in the foregoing embodiments. However, the weak spots need not be of varying weakness but can be designed to rupture substantially at the same time so that a plurality of openings as represented by the flaps 136 will permit the passage of fluid from the innermost cylinder 132 into the space defined between the innermost cylinder and the outermost cylinder 134, as indicated by the arrows 138. The space between the two cylinders may be an annular space having an annular piston 140 therein connected to a bumper 12 of a motor vehicle by means of a plurality of piston rods 142. Alternatively, the space between the two cylinder walls could be divided into a plurality of sectors and the annular piston would likewise be divided into a plurality of pistons, one for each sector. A main piston 144 is also connected to the bumper 12 to impart the force applied to the bumper to the fluid within the cylinder 132. As the fluid passes to the space between the inner and outer cylinders, the fluid will be further compressed by the piston or pistons 140 and flow outwardly through the auxiliary passages 150 and 152, which are disposed in communication with the space between the two cylinders. A plurality of diaphragms or rupturable plates 154 are disposed within the passages 150 and 152 at spaced locations. The force applied to the fluid will rupture the membranes or plates 154 in sequence. Thus the series of sequential rupturings will gradually dissipate the force applied to the bumper.

Figure 10:
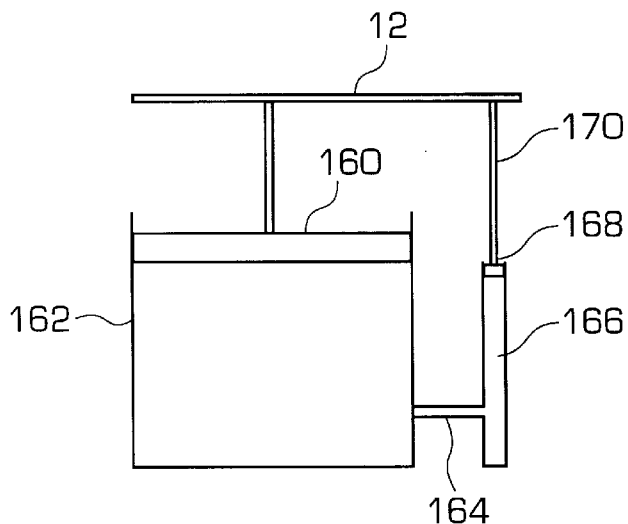
FIG. 10 is a schematic view of a piston and cylinder arrangement according to the present invention wherein the fluid expelled from the cylinder is applied to a reverse acting piston.

As shown in FIG. 10, a force applied to the bumper 12 will be applied to the piston 160 in a cylinder 162. Instead of having a plurality of weak spots which will rupture upon the application of pressure to the fluid within the cylinder, the fluid is forced through a passage 164 through one or more auxiliary cylinders 166, only one of which has been illustrated in FIG. 10. Each auxiliary cylinder 166 is provided with a piston 168 connected to the bumper by means of a connecting rod 170. Thus upon application of a force to the bumper, the force will be resisted by the fluid within the main cylinder 162 and additional forces will be applied in the reverse direction to the bumper 12 by means of the auxiliary piston and cylinder arrangements.

Figure 11:
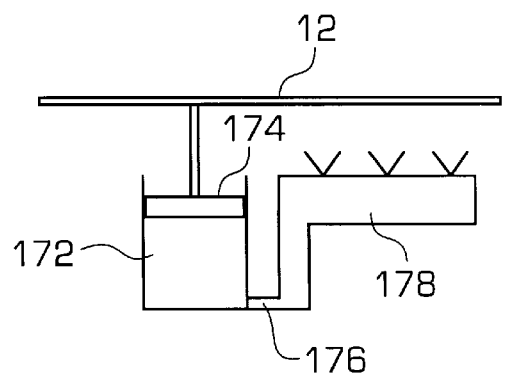
FIG. 11 is a schematic view of a piston and cylinder arrangement according to the present invention wherein the fluid expelled from the cylinder is reversely directed against the rear of the bumper.

In a similar arrangement shown in FIG. 11, the fluid in a main cylinder 172 is forced by means of a piston 174 connected to a bumper 12, through a passage 176 adjacent the bottom of the cylinder 172 into a transverse chamber 178, which can be coextensive with the length of the bumper 12 and located on the reverse side thereof. The chamber 178 is provided with a plurality of small apertures which may be permanently provided in the wall of the chamber or which may be caused upon displacement of plugs or weak spots as the fluid pressure increases within the chamber 178. Thus, the fluid under pressure will be sprayed against the side of the bumper opposite to the side to which the impact force is applied. Thus the impact force applied to the bumper 12 would not only be resisted by the fluid within the cylinder 172, but will also be resisted by the force of the fluid being sprayed against the reverse side of the bumper 12.

As discussed previously, the weak spots defined by the plurality of recesses of varying depth may be formed by stamping or drilling the wall of the cylinder. The depth of the drill holes can easily be calibrated to provide recesses of varying depth, which will define the rupture points for the cylinder. A stamping arrangement may be in, wherein the die members, which are suitably dimensioned to provide recesses of varying depth, may be moved against the wall of the cylinder. A solid stiffening rod may be inserted in the cylinder prior to the stamping operation to prevent collapse of the cylinder wall.

An apparatus may be provided for etching recesses of varying depth in the walls of the cylinders, which are suspended from a movable support. The cylinders may be initially dipped in a wax bath to provide a coating of wax over the entire external surface of the metal cylinder. The wax can then be scraped away in a plurality of locations along the length of each cylinder. The cylinders can then be dipped into a vat containing acid suitable for etching recesses into the unprotected surface areas of the cylinders. Since the unprotected areas on the cylinders remote from the carrier will remain in the acid bath longer than the other areas along the length of the cylinders, the recesses will be etched deeper in those areas furthest from the support. In lieu of wax and acid, any other well known masking materials and etching agents could be utilized. It is also possible to utilize laser beams for cutting the surfaces of the tube to provide the recesses.

As mentioned previously, the cylinders may be made of any suitable material which is capable of maintaining the desired cylindrical form while permitting localized rupturing of weakened areas. For example, the cylinder could be of plastic material wherein an injection molding process could be used. The mold would have appropriate recesses and/or projections on the opposed surfaces of the male and female mold elements to define the weakened areas in the desired sequence of strength to achieve a controlled rupturing of the cylinder wall. The cylinder and additional cylindrical lamination of the embodiment could also be of plastic material. Whenever the cylinder is made of plastic material, it may be necessary to reinforce the cylinder with embedded metal reinforcements or an external shell of metal or the like which will not interfere with the weakened spots but which will prevent the plastic cylinder from ballooning instead of rupturing at the weak spots.

The weakened areas may be disposed in a line parallel to the axis of the cylinder as shown in FIG. 1. It is also possible to provide a plurality of longitudinal rows of recesses of varying depth. It is also possible to locate the recesses of varying depth along other paths such as along diagonal or spiral lines on the circumference of the cylinder or randomly over the surface of the cylinder. The spacing of the recesses or weakened areas can be varies along the predetermined lines and could even be contiguous with each other to define a continuous weakened line or lines in the cylinder wall. The deepest recesses would be closest to the top of the cylinder, which would be adjacent the bumper, whereas the shallowest recesses would be closest to the frame of the vehicle. The coil springs would be made of conventional spring steel and the flexible tension elements can be made of wire such as copper or the like or suitable plastic materials which have a high tensile strength. Likewise, nylon threads of varying denier may be utilized.

While the energy absorbing device is disclosed for use between a bumper and a frame of a motor vehicle, it is obvious that the device could be used in conjunction with highway barriers, elevator safety devices or containers dropped from an aircraft.

While the invention has been particularly shown and described with reference to preferred embodiments thereof, it will be understood by those in the art that the foregoing and other changes in form and details may be made therein without departing from the spirit and scope of the invention.

What is claimed is:

1. An energy absorbing device comprising a liquid filled cylinder having at least one closed end adapted to be mounted on a support and a piston slidably mounted in said cylinder for increasing the pressure the liquid exerts on the cylinder and adapted to be operatively connected to an impact receiving device, said cylinder having a circumferential wall of predetermined length and at least two weakened areas disposed in spaced relation to each other along the length of the cylinder with the area furthest from the closed end of the cylinder being the weakest, whereby upon application of pressure to said liquid, only said weakened areas will be ruptured in sequence by the liquid under pressure, rendering the device unusable for future use.

2. An energy absorbing device as set forth in claim 1, further comprising additional weakened areas disposed in spaced relation to said at least two weakened areas along the length of the cylinder, the weakness of each area increasing in weakness from the closed end to the area furthest from the closed end.

3. An energy absorbing device as set forth in claim 1, wherein said weakened areas are defined by recesses in the circumferential wall of different depth with the deepest recess defining the weakest area in the wall.

4. An energy absorbing device as set forth in claim 1, further comprising a coil spring disposed in said liquid filled cylinder between said piston and said closed end.

5. An energy absorbing device as set forth in claim 4, wherein said coil spring has a conical configuration which enables the coils of the spring to nest within each other in a common plane upon being compressed.

* * * * *